US008548063B2

(12) United States Patent
Klebanov et al.

(10) Patent No.: US 8,548,063 B2
(45) Date of Patent: Oct. 1, 2013

(54) VIDEO RECEIVER PROVIDING VIDEO ATTRIBUTES WITH VIDEO DATA

(75) Inventors: Ilya Klebanov, Thornhill (CA); Allen J. Porter, Sunderland (CA)

(73) Assignee: Broadcom Corporation, Irvine, CA (US)

( * ) Notice: Subject to any disclaimer, the term of this patent is extended or adjusted under 35 U.S.C. 154(b) by 1334 days.

(21) Appl. No.: 11/402,902

(22) Filed: Apr. 13, 2006

(65) Prior Publication Data

US 2007/0262979 A1 Nov. 15, 2007

(51) Int. Cl.
 H04N 7/12 (2006.01)
(52) U.S. Cl.
 USPC .................................................. 375/240.26
(58) Field of Classification Search
 USPC .................................................. 375/240.26
 See application file for complete search history.

(56) References Cited

U.S. PATENT DOCUMENTS

| | | | | |
|---|---|---|---|---|
| 6,141,385 A * | 10/2000 | Yamaji | ...................... | 375/240.27 |
| 7,088,398 B1 * | 8/2006 | Wolf et al. | ................. | 348/423.1 |
| 7,606,305 B1 * | 10/2009 | Rault | ....................... | 375/240.12 |
| 2002/0163970 A1 | 11/2002 | Nishio et al. | | |
| 2004/0136457 A1 * | 7/2004 | Funnell et al. | ............ | 375/240.01 |
| 2007/0081587 A1 * | 4/2007 | Raveendran et al. | ...... | 375/240.1 |

OTHER PUBLICATIONS

"Format of Ancillary Data Signals Carried in Digital Component Studio Interfaces", Recommendation ITU-R BT.1364, 1998.
"Interfaces for Digital Component Video Signals in 525-Line and 625-Line Television Systems Operating at the 4:2:2 Level of Recommendation ITU-R BT.601 (Part A)", Recommendation ITU-R BT.656-4, 1998.
"Encoding Parameters of Digital Television for Studios", Recommendation ITU-R BT.601-4, 1994.
Jack, Keith, "Video Demystified: A handbook for the digital", 2005, pp. 595-635, Oxford:Elsevier.
PNX17xx Series Data Book, vol. 1 of 1 Connected Media Processor, Rev. 0.2, Dated Oct. 7, 2005.
Vishal Markandey et al: "TMS320DM642 Technical Overview: DSP Video and Imaging Digital Applications", , Sep. 30, 2002, XP55016569, Retrieved from the Internet: URL:http://www.ti.com/litlug/spru615/spru615.pdf [retrieved on Jan. 16, 2012].
Jack K: "Video Demystified, Digital Video Interfaces", Video Demystified, XX, XX, Jan. 1, 2001, pp. 92-185, XP002393272.
"SAA7120; SAA7121 Digital Video Encoder (ConDENC)",, Jan. 6, 1997, XP55016661, Retrieved from the Internet: URL:http://pdf1.alldatasheet.com/datasheet-pdf/view/19009/PHILIPS/SAA7120/+0J1Q-UL.hKpRudVGhEYCv+/datasheet.pdf [retrieved on Jan. 17, 2012].
European Summons to Attend Oral Proceedings in copending, related European Application No. 07734433.1, mailed Jan. 26, 2012.

* cited by examiner

Primary Examiner — Richard Torrente
(74) Attorney, Agent, or Firm — Thomas|Horstemeyer, LLP

(57) ABSTRACT

A device and method for receiving a compressed video bit stream, and providing decoded video pixels and associated video attributes synchronously to a video processor are disclosed. A compressed video bit stream is received and decoded. The decoded pictures have associated video attributes. A subset of the video attributes is provided to a video processor interconnected to a display. The video attributes are provided synchronously with the picture or pixel data so that the attributes are available to video processor before the associated picture is displayed.

23 Claims, 3 Drawing Sheets

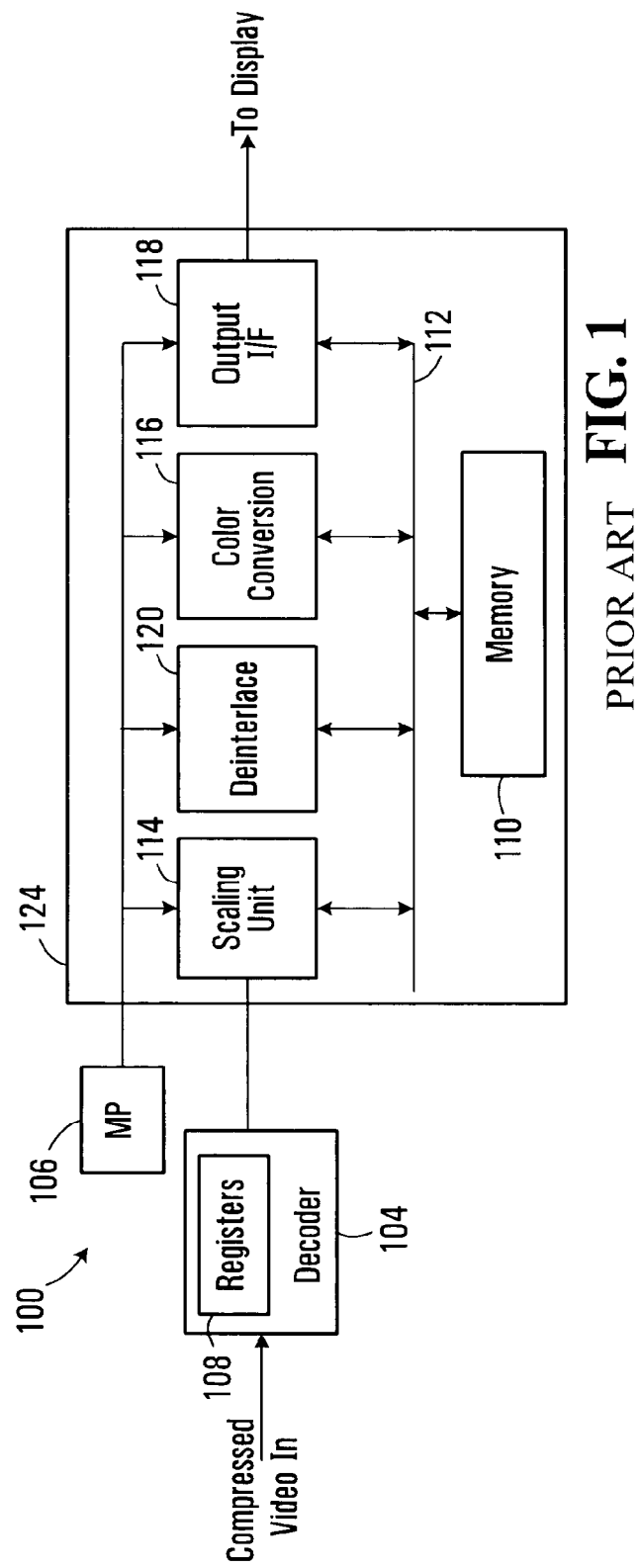
PRIOR ART FIG. 1
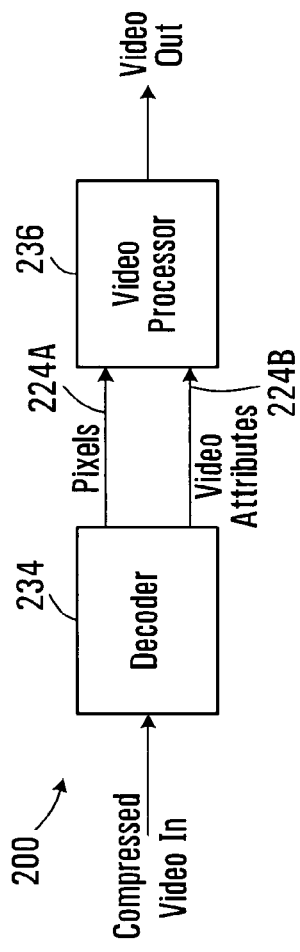
FIG. 2

VIDEO RECEIVER PROVIDING VIDEO ATTRIBUTES WITH VIDEO DATA

FIELD OF THE INVENTION

The present invention relates generally to a video receiver and more particularly to a video data transfer method within a receiver that decodes video data and provides video attributes with the decoded video data.

BACKGROUND OF THE INVENTION

Digital video is now in wide-spread use. Digital video is formed by sampling and quantizing an analog video signal. As raw digital video requires a large amount of bandwidth for transmission, digital video data is typically encoded before it is transmitted to a receiver.

Standard encoding algorithms include MPEG-1, MPEG-2 from ISO, H.261, H.264 from ITU-T, DV, QuickTime or another algorithm. Known video compression algorithms typically involve a lossy transform of images in the video sequence, which are then entropy coded to achieve efficient compression. MPEG-1 and MPEG-2 for instance make use of the discrete cosine transform (DCT) of blocks of pixels in images of the source video sequence, and run-length coding and entropy (Huffman) coding to further compress data. At the receiver, video is decompressed and additional processing of the decompressed video is performed to display the transmitted video.

Encoded video may take many formats and have numerous attributes. For example, images of varying size, color format (chroma format), structure (e.g. progressive or interlaced), etc. may be encoded.

A typical digital video receiver generally includes a decoder unit, and a video processor. The decoder accepts the compressed video stream and produces a decoded video sequence. Decoding is achieved by reversing the transformation process that took place during encoding. After decoding, the video data is fed to a video processor. The video processor performs additional signal processing needed to reproduce the video on a display device. The video processor may, for example, scale the video to fit the decoded video onto the available display resolution of the display device; perform color space transformation to display YCrCb encoded video on an RGB display; and the like.

Attributes of the decoded video stream may change on any given frame boundary or within a given frame, depending on the way the original video source was encoded. This may happen for example when commercials are inserted in a video stream for broadcast. This may also be observed, at the boundary of two sequences when the decoder decompresses a concatenated sequence from two or more sources.

For example, MPEG-2 may be field-encoded or frame-encoded. Field-encoded video, odd numbered lines of a frame (called the top-field) are followed by even numbered lines of the frame (called the bottom-field) in alternating fashion. In contrast, frame-encoded video consists of non-interlaced (progressively scanned line by line) video. An MPEG-2 video sequence may have a mixture of pictures that which may be fields or frames in the same sequence. The encoder may decide on a frame by frame basis, to use two field-pictures or one frame-picture to encode an incoming frame. Since the use of an incorrect picture structure by the decoder, may lead to severe distortions, the video processor must receive and process the picture structure type information before a picture is processed and the associated frame is displayed.

Other properties that may change within the video stream also include resolution, picture structure type (field or frame), and chroma format (or pixel format).

In conventional video receivers, changes in the properties or attributes of decoded video frames are first detected by the decoder and are propagated through to the video processor. Software is typically used to transfer attribute data between the decoder and the video processor.

Unfortunately, software often incurs delays and time may elapse before the video processor receives the new properties or attributes of a decompressed video frame from the decoder. During this elapsed time, the decoded video frame exhibits undesirable visual artifacts when displayed, as the video processor operates under wrong parameters. Depending on how frequently these video attributes change, and the delay in transferring the attribute change to the video processor, an unacceptable number of frames may be incorrectly displayed during playback.

Accordingly, there is a need for a video receiver capable of quickly reacting to changes in video attributes of a digital video stream.

SUMMARY OF THE INVENTION

In accordance with an aspect of the present invention, a device and method are provided, for receiving a compressed video bit stream, and providing decoded video pixels and associated video attributes to a video processor.

In accordance with an aspect of the present invention, a video receiver includes a video decoder for receiving an encoded stream of video data and decoding the encoded stream into a pixel stream representing video images and associated attribute data describing the video images; a channel encoder for encoding the pixel stream on a first channel, and the attribute data on a second channel, and combining the first and second channels so that there is a defined relationship between video pixels in an image and attribute data for the image.

In accordance with another aspect of the present invention there is provided, a method for displaying video from a compressed video bit stream. The method includes decoding the compressed video bit stream to form a decompressed pixel stream and associated video attribute data; transferring the pixel stream to a video processor for processing the pixel stream for presentation on a display; transferring the associated video attribute data to the video processor in a defined relationship with the pixel stream; and processing in the video processor video images using the associated video attribute data, and displaying each processed video frame on the display.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 is a simplified schematic block diagram of a conventional video receiver;

FIG. 2 is a logical block diagram of a video receiver, exemplary of an embodiment of the present invention;

DETAILED DESCRIPTION

Figure 3:
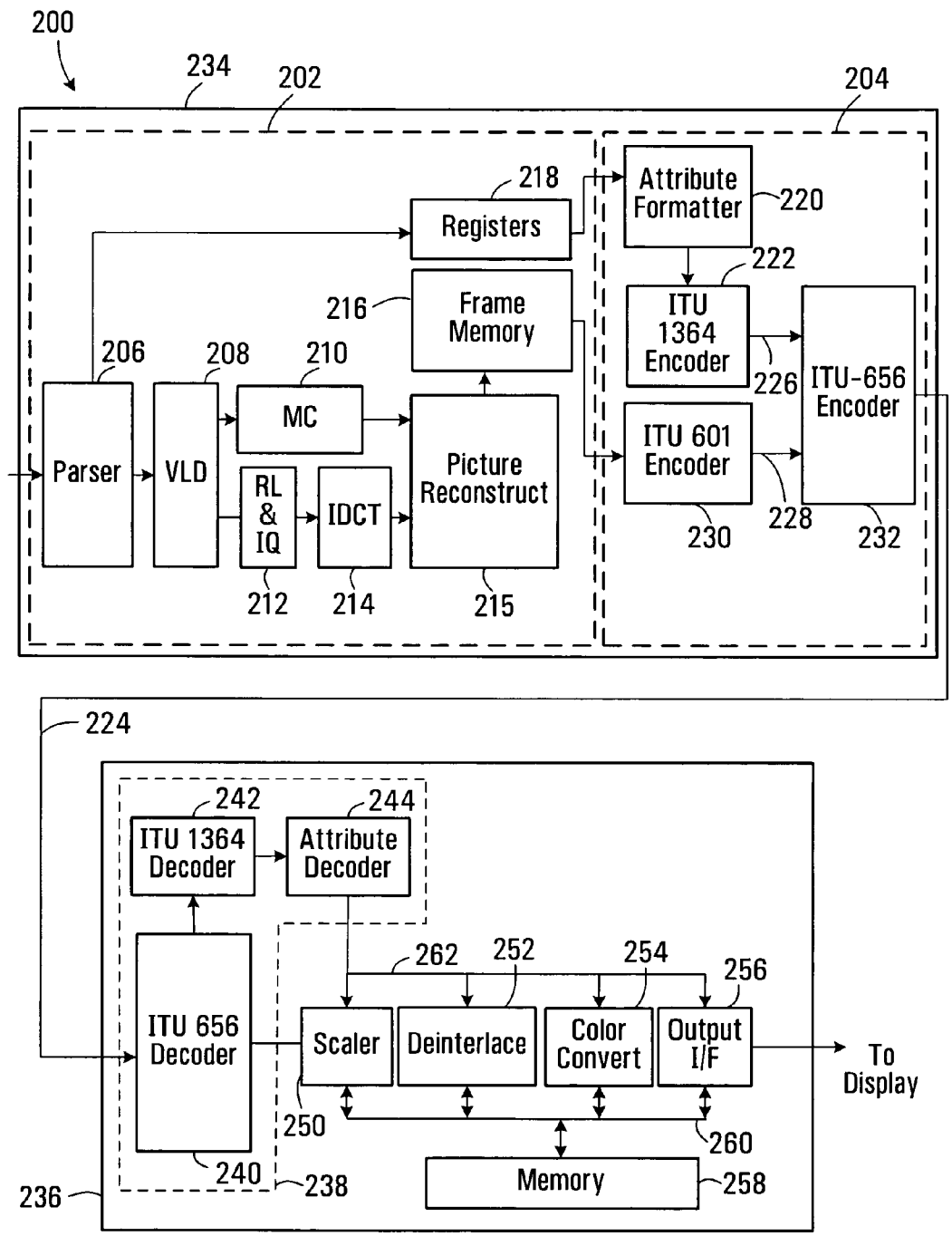
FIG. 3 is a functional block diagram of the video receiver of FIG. 2.

FIG. 1 is a simplified block diagram of a conventional video receiver 100 capable of processing streams of digitally encoded video. Receiver 100 includes a decoder 104 and a video processor 124. Decoder 100 decodes a received encoded video stream into pixel values. Video processor 124 provides a video image for display to an interconnected display device 122. Decoder 104 and video processor 124 are in communication with a host processor 106.

Video processor 124 includes scaler 114, deinterlacer 120, color converter 116; and a video output interface 118. Video output interface 118 is interconnected with display 122. Further, example video processor 124 includes local memory 110 that provides a frame buffer for storing frames to be displayed by output interface 118.

Output interface 118 is typically a random access memory digital to analog converter (RAMDAC) that interconnects with display device 112, in the form of a television, computer monitor, LCD or other display, or the like.

Scaler 114, deinterlacer 120, and color converter 116 are functional blocks that may be implemented in hardware or software. Operating parameters of output interface 118, scaler 114, deinterlacer 120 and color converter 116 are programmable. For example, input and output color space used by color converter 116 may be programmed. Similarly, scaling ratio, and de-interlacing algorithm may be programmed. Programming may, for example, be accomplished by the setting of hardware registers (not shown); software variables; or the like.

Bus 126 is used to transfer decoded video data from decoder 104 to video processor 124. Bus 126 may be a memory bus, a dedicated serial or parallel link, or the like. As depicted, decoder 104 passes data directly to video processor 124. However, decoder 104 may pass decoded video data to a buffer (not shown) that may be formed in memory 110, or elsewhere.

Video attribute data such as resolution, chroma format and picture structure, are also transferred from decoder 104 to processor 106. Processor 106, in turn, sets the operating parameters of video processor 124. This may, for example, be accomplished by setting registers (not shown) of video processor 124 to adjust operation of scaler 114, color converter 116, deinterlacer 120 and output interface 118.

Decoder 104 receives a compressed/encoded video stream. The source of the encoded video stream may be a demodulated digital satellite or cable television channel, a terrestrial broadcast channel, a local video archive or a computer readable memory, such a flash memory, a peripheral device such as an optical drive, or the like.

As will be appreciated, the encoded video stream includes syntax elements to describe the encoded video data. The format of an MPEG-2 stream for instance, is organized hierarchically into sequences, group of pictures, pictures, slices, macro-blocks, and blocks respectively. Blocks contain DCT coefficients. A macro-block includes four blocks of luminance samples and a corresponding number of chrominance blocks depending on the pixel format or chroma format. That is in a 4:2:2 encoded chroma format, a macro-block has 4 Y blocks, 2 Cr blocks and 2 Cb blocks. Similarly in 4:4:4 encoded chroma format the macro-block has 4 blocks of Y, 4 blocks of Cr and 4 blocks of Cb. Slices are subsets (horizontal strips) of pictures that contain several macro-blocks. Pictures may be fields or frames. Frames may be I-frames (intra-frame frames), P-frames (predicted frames) and B-frames (bi-directionally predicted frames). The MPEG-2 video syntax is described for example in Jack, Keith. 2005. *Video Demystified: A handbook for the digital engineer.* 4$^{th}$ ed. Oxford: Elsevier, the contents of which are hereby incorporated by reference.

Syntax elements of interest include the vertical size value, the horizontal size value, aspect ratio, the color format, picture structure type and the quantization matrix used. Some or all of these are defined for both the MPEG 2 sequence, and for individual pictures (fields or frames). From the syntax elements, video attributes including the color format, size, and structure of the current image may be extracted to form a collection of video attribute data. Conventional decoder 104 may store video attribute data in a series of readable registers 108. The registers may be updated periodically, for each sequence of frames, or more frequently.

In operation, processor 106 initializes video decoder 104 to process the encoded video stream. Decoder 104 decodes the stream by reversing encoding operations. That is, decoder 104 entropy-decodes the stream; parses it according to its embedded syntax; extracts run-length values; and performs inverse discrete cosine transformation and motion compensation. As the stream is parsed attribute information is extracted and registers are loaded with corresponding attribute data. The pixels are recovered by inverse discrete cosine transforming (IDCT) the coefficients. Motion compensation vectors, if any, are subsequently applied to the decoded pixels to correct for any motion between a reference frame and the current frame. Pixels in decoded frames are transferred as a pixel stream to video processor 124 through bus 126.

Processor 106 reads registers 108 to extract attribute data and initializes operating parameters of video processor 126, based on extracted attribute information.

Subsequent frames of the stream are similarly processed, and motion video is ultimately displayed on display 122. Operating parameters of video processor 124 are updated by processor 106 as new attribute data becomes available.

Video data should be displayed at a reasonably constant frame rate. Therefore frame data is supplied to display 122 before the next refresh cycle on the display. Pixel data is output by decoder 104 in the order frames are to be displayed.

Operating parameters of video decoder 124, however, are typically not updated at a pre-determined rate. Instead they are updated when changes to the registers storing video attribute data are detected by processor 104, and processor 104 has an opportunity to update the corresponding operating parameters.

As video attributes typically change infrequently, the timing of updates to operating parameters of video processor 124 usually does not affect display quality. However, if attributes change quickly, artifacts may be visible. For example, if image attributes for a decoded frame have changed from a previous frame, but operating parameters of video processor 124 have not been updated with new image attributes, the frame will be displayed with artifacts. Similarly, if operating parameters of video processor 124 are prematurely updated, artifacts may result.

FIG. 2 therefore logically illustrates a video receiver 200, exemplary of an embodiment of the present invention. Receiver 200 may be formed in custom hardware, or general purpose computing hardware under software control, or a combination of the two. Exemplary software may be loaded into a memory of a general purpose computing device from a computer readable medium.

As illustrated, receiver 200 includes a decoder 234, and video processor 236. Decoder 234 decodes a received digitally encoded stream, into a stream of pixel values. Video processor 236 uses these pixel values to provide video to display device. Decoder 234 is in communication with video processor 236 by way of bus 224A, 224B.

Again, compressed video data arriving at decoder 234, may originate with any conventional source, such as a satellite or cable television channel, terrestrial broadcast channel, local video archive or peripheral device such as a DVD player.

Exemplary of embodiments of the present invention, video attributes are provided by decoder 234 to video processor 236, once the stream is decoded, in a defined relationship with the decoded pixel stream. Video attributes of decoded video may for example be provided synchronously, frame by frame, at intervals of a chosen number of frames, or whenever attributes change from a previous frame.

To this end, video pixel data and attribute data are synchronized at decoder 234 and provided to video processor 236 by way of separate channels 224A, 224B.

More specifically, FIG. 3 includes a simplified functional block diagram of video receiver 200. As illustrated decoder 234 includes an MPEG decoder 202, and a channel formatter 204 used to create two synchronous channels 224A and 224B: channel 224A for video data, and channel 224B for attribute data. In the depicted embodiment channel formatter 204 includes an attribute formatter 220, an ITU-R BT.1364 compliant encoder 222, an ITU-R BT.601-4 compliant encoder 230 and ITU-R BT.656-4 compliant encoder 232. Recommendation ITU-R BT.1364 entitled "Format of Ancillary Data Signals Carried in Digital Component Studio Interfaces"; Recommendation ITU-R BT.601-4 entitled "Encoding Parameters of Digital Television For Studios"; and Recommendation ITU-R BT.656-4 entitled "Interfaces for Digital Component Video Signals in 525-Line and 625-Line Television Systems Operating at the 4:2:2 Level of Recommendation ITU-R BT.601 (part A)", are hereby incorporated herein by reference. Fortunately, the 4:2:2 chroma format defined in ITU-R BT.656-4 allows a 4:2:0 encoded video signal to be transmitted. MPEG-2 accommodates both 4:2:2 and 4:2:0 chroma sub-sampling. The 4:2:0 chroma format is used for a commercially significant MPEG-2 profile called 'main profile at high level' (MP@HL). Thus, it is advantageous to be able to transmit 4:2:0 format signals using ITU-R BT.656 interfaces. The chroma samples in a 4:2:0 signal may simply be replicated to conform to the 4:2:2 format defined in ITU-R BT.656 (shown in FIG. 4). Alternately, a 4:2:0 encoded signal may also be sent natively using only half the bandwidth allocated for chroma data.

MPEG decoder 202 includes a parser 206, a variable length decoder (VLD) 208, a motion compensation block (MB) 210, a run length decoder and inverse quantization (RL & IQ) block 212, an inverse discrete cosine transform block (IDCT) 214, a picture reconstruction block 215 and memory 216 for storing frames, as found in conventional MPEG decoders and known to those of ordinary skill.

MPEG decoder 202 may differ slightly from a conventional MPEG decoder in that it outputs extended attribute information to attribute formatter 220. That is, MPEG decoder 202 outputs image size, color format, and picture structure. Again, attribute information may be formatted as attribute data, and stored in registers 218, software variables, or the like.

Attribute formatter 220 reads selected video attribute data from registers 218, and optionally formats these in accordance with a mapping described below. Desired video attributes for transmission include resolution, picture structure type (frame or field), chroma format and the like. The video attributes are decoded synchronously with each frame or field, by MPEG decoder 202 and a subset of the decoded attribute is transmitted along with the video data stream to video processor 236.

In the depicted embodiment, attribute formatter 220 outputs formatted attribute data to a preferably ITU-R BT.1364 compliant encoder 222 which converts the attribute data into a stream compliant with ITU-R BT.1364.

Pixel data associated with frames or fields in the decoded bit stream are read from frame memory 216 by a preferably ITU-R BT.601-4 compliant encoder 230 and encoded in conformity with ITU-R BT.601-4.

Frame attribute data and pixel outputs may thus, for example, be provided synchronously to video processor 236, by way of two synchronous channels 224A, 224B carried on bus 224. Channel formatter 204 may thus further include a preferably ITU-R BT.656-4 compliant encoder 232 that multiplexes video pixel data stream 228 and video attribute data stream 226.

Video processor 236 includes a scaler 250, de-interlacer 252, color space converter 254 and an output interface 256. Output interface 256 may be a conventional RAMDAC. Exemplary video processor 236 also includes memory 258. Bus 260 interconnects scaler 250, de-interlacer 252, color converter 254, output interface 256 and memory 258.

Video processor 236 additionally includes a channel decoder 238, complementary to channel formatter 204. In the depicted embodiment, channel decoder 238 includes an ITU-R BT.656-4 compliant decoder 240, that acts as a demultiplexer, in communication with ITU-R BT.1364 compliant decoder 242.

Output of decoder 242 is provided to an attribute decoder 244 interconnected to scaler 250, deinterlacer 252, color space converter 254 and output interface 256.

In operation, a video stream is received by video decoder 202. Parser 206 parses the incoming bit stream and assembles the coding structures used in the bit stream such as the sequence header, sequence extension header, possible user data and other extension headers. Next, the group of pictures (GOP) header is read which describes the GOP. The next coding structures to be parsed after the sequence header and sequence header extension are the picture header and the picture header extension. Again these coding structures are preceded with a start code that the decoder detects to start assembling them. The attribute information contained in the picture header and picture header extension structures apply to the properties of the current picture being decoded. The picture header and picture extension header provide all necessary attributes of a picture. DCT coefficients are run-length decoded and inverse quantized, and transformed to pixel domain values using blocks 212 and 214 respectively. The process is then repeated for the next image.

By parsing the stream, video decoder 202 is able to identify relevant image attribute data corresponding to the current image being reconstructed (based on picture, macro-block, block etc.) and can thus provide all or a subset of these attributes in a defined relationship along with each frame or subset of a frame that is read out of memory 216 to registers 218. In other words, decoder 202 extracts all attributes describing a frame, ahead of the reconstruction of the decompressed pixels of the frame in memory 216. All or a subset of the attributes may then be appropriately formatted and transmitted to video processor 236.

Attribute formatter 220 may format attribute values in accordance with the mapping shown in TABLE 1. When line data of a picture is read out of memory 216 into video pixel encoder 230, the corresponding attribute data for the image is also provided by attribute formatter 220 to attribute data encoder 222. The attribute data and video pixel data are then multiplexed by channel encoder 232 and then passed to video processor 236, by way of channels 224A and 224B.

Figure 4:
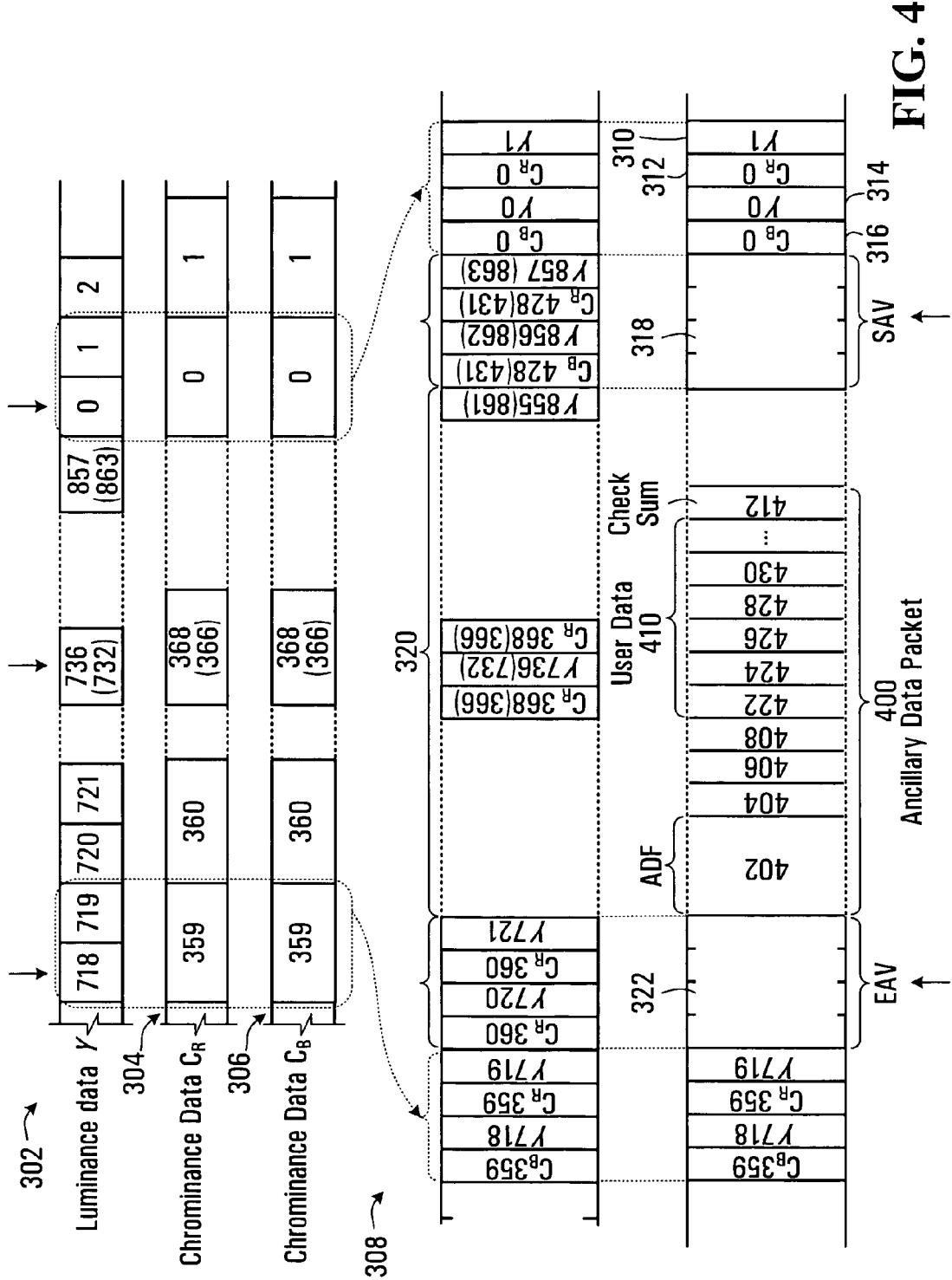
FIG. 4 is a block diagram of an exemplary signal format used to transfer data from the decoder to the video processor in the video receiver of FIG. 2.

Channel encoder 204 uses the interface signal structure recommended by Recommendation ITU-R BT.656-4 which is depicted in FIG. 4. In each line, 720 luminance values (Y) 302 and chroma values, Cr 304 and Cb 306, taken from a ITU-R BT.601-4 compliant stream are transmitted using format 308. Thereafter, an end of active video (EAV) sequence 322 and start of active video (SAV) sequence 318 serve as timing reference signals. The digital blanking interval 320 between the timing reference signals is used to carry ancillary signals.

FIG. 4 further illustrates an exemplary ancillary data packet format Type 1, compliant with Recommendation ITU-R BT.1364. The ancillary data packet 400 occupies the interval 320 between EAV signal 322 and SAV signal 318. In 8 bit operations, each word has 8 bits while in 10 bit operations, each word represents a 10-bit value. The ancillary data flag (ADF) 402 is followed by data type 404, data block number 406, data count 408 and user data 410 followed by a checksum 412. ADF 402 consists of three words while the data id 404 takes one word. As detailed in ITU-R BT.1364, ADF consists of a three word sequence of hexadecimal numbers ($00.0_H$, $FF.C_H$, and $FF.C_H$). In this notation (e.g. $FF.C_H$) the 8 most significant bits are represented by the integer part while the fractional part represents the two additional bits (in a 10-bit word). Thus, for the ADF sequence ($00.0_H$, $FF.C_H$, $FF.C_H$) the first word has all bits set to zero while the next two words have all their bits set to one. Data block number 406 and data count 408 take up one word each. User data may be as long as 255 words. Checksum 412 is used to detect errors.

As illustrated, a user defined preamble 422 indicates that data to be transferred is one of chroma format, resolution, picture structure type or the like. TABLE 1 shows simple exemplary mappings of preamble to attributes of interest.

User defined attribute code 424 identifies the type of attribute (chroma format, resolution, picture structure type, etc.) the subsequent words refer to. The next word 426 may indicate the particular data being transmitted such as 4:2:2 for chroma format attribute. A value of $01.0_H$ following the chroma format attribute code, for example, can be used to denote that 4:2:2 chroma format is used. A value of $02.0_H$ following the chroma format attribute code is used to denote that 4:4:4 pixel sampling format is used.

For resolution information, more words may be used. A word in location 424 (attribute code) indicates that resolution information will follow in next words. The word value in location 426 indicates whether horizontal or vertical resolution is being specified as shown in TABLE 1. The value of the resolution is specified in locations 428 and 430 which carry the most significant bits (MSB) and least significant bits (LSB) of the resolution respectively. Even in 8-bit operations, a 16-bit value can be stored using two words, which should suffice for any practical value of resolution.

TABLE 1

| PREAMBLE | $1^{st}$ Word | $2^{nd}$ Word | $3^{rd}$ Word | $4^{th}$ Word | Remarks |
|---|---|---|---|---|---|
| $55.1_H$ | $01.0_H$ | $01.0_H$ | — | — | Chroma format is 4:2:2 |
| $55.1_H$ | $01.0_H$ | $02.0_H$ | — | — | Chroma format is 4:1:1 |
| $55.1_H$ | $01.0_H$ | $03.0_H$ | — | — | Chroma format is 4:4:4 |
| $55.1_H$ | $01.0_H$ | $04.0_H$ | — | — | Chroma format is 4:2:0 |
| $55.1_H$ | $02.0_H$ | $01.0_H$ | — | — | Frame is field-encoded |
| $55.1_H$ | $02.0_H$ | $02.0_H$ | — | — | Frame is frame-encoded |
| $55.1_H$ | $03.0_H$ | $01.0_H$ | $02.0_H$ | $00.0_H$ | Horizontal Resolution is 512 |
| $55.1_H$ | $03.0_H$ | $02.0_H$ | $02.0_H$ | $00.0_H$ | Vertical Resolution is 512 |

Of course, the above example encoding scheme is only exemplary. Other ways of encoding attributes will work equally well. Any number of additional types of attribute data may be suitably encoded.

The attributes can be aggregated and transmitted along with each frame using the ancillary channel or alternately they may only be transmitted when there is a change in value. Corresponding logic may form part of attribute formatter 220.

Channel 224B containing changing attributes of the video stream, sent to video processor 236, may thus be carried using ancillary signals defined in the interface standard. Since the ancillary signals are sent synchronously with the video signals, the use of Recommendation ITU-R BT.656-4 between decoder 234 allows for synchronous transfer of the video attribute data (chroma format, resolution etc) along with video pixel data. ITU-R BT.656-4 allows for the flexible packaging and synchronous provision of ancillary data with video. For example, ITU-R BT 656-4 is often used to convey teletext, close caption and similar information with video information. As will be appreciated, the ancillary channel 224B is time division multiplexed with the video pixel data carried on channel 224A and sent during horizontal blanking intervals, interposed within the video pixel data stream.

Physical link 224 carrying channels 224A and 224B may be a serial or parallel link. As mentioned, link 224 may also be compliant with ITU-R BT.656-4. As will be appreciated, ITU-R BT.656-4 defines eight (optionally ten) conductor pairs for transmitting data and an additional pair for a synchronous clock at 27MHz. The interface provides a unidirectional interconnection between a single source and a single destination.

Video processor 236 uses its channel decoder 240 to separate the data stream received on bus 224 into an ITU-R BT.601-4 compliant stream provided to scaler 250 and an ITU-R BT.1364 compliant ancillary data stream provided to decoder 242. In the depicted embodiment, scaler 250 has an ITU-R BT.601-4 compliant input interface for receiving video data input.

Attribute decoder/control block 244 decodes the attribute data received from decoder 242 and programs interconnected blocks scaler 250, deinterlacer 252, color converter 254 and output interface 256 with appropriate control bits corresponding to the attribute of the current frame being processed.

As can now be appreciated, the use of a video channel 224A and a synchronous attribute data channel 224B ensures that all attribute data needed to program scaler 250, deinterlacer 252, color converter 254 and output interface 256 is received concurrently with the frame being processed in video processor 236.

Conveniently, the synchronization of the attribute data with video data in associated frames eliminates artifacts introduced as a result of delay in transferring to the video processor, new or changed attributes of frames in the video sequence. With the synchronous transmission of the new properties, the video processor parameters may be adjusted as the affected frame is to be displayed. Thus the artifacts identified are eliminated and the video display device seamlessly continues to display frames with increased/reduced resolution, new chroma formats or the like.

As will now be appreciated, attribute data may be provided to video processor 236 concurrently with an image to be displayed, or in advance of the image to be displayed. As will also be appreciated, the specific nature of provided channels may differ from those used in the disclosed embodiment. For example, ITU-R BT.1364, ITU-R BT.601-4 and ITU-R BT.656-4 compliant streams need not be used. Many ways of synchronizing and multiplexing video and ancillary data will be apparent to those of ordinary skill.

Of course, the above described embodiments are intended to be illustrative only and in no way limiting. The described embodiments of carrying out the invention are susceptible to many modifications of form, arrangement of parts, details and order of operation.

The various functional blocks in the receiver 200 may be implemented as discrete components or in a single integrated circuit (IC).

In an alternate embodiment, the interface between decoder 234 and video processor 236 may also use separate physical connections for the video pixel channel 224A and the channel 224B carrying attribute data, which however share the same clock source to achieve synchronization. Link 224 may thus be between two devices, such as a computer peripheral and a computer device; a wireless transmitter and receiver; a video player and recorder; or the like. Link 224 could thus be formed in many ways, including an electrical, optical or wireless link.

The invention, rather, is intended to encompass all such modification within its scope, as defined by the claims.

What is claimed is:

1. A video receiver, comprising:
   a video decoder comprising a parser, a frame memory, and registers, said video decoder operable to receive an encoded stream of video data and to decode said encoded stream into a pixel stream representing video images, said pixel stream stored in said frame memory, said parser operable to parse associated attribute data from said encoded stream and store said attribute data in said registers, said attribute data describing said video images; and
   a channel formatter comprising an attribute formatter, a pixel encoder, a data encoder, and a channel encoder, said attribute formatter operable to read said attribute data from said registers, format said attribute data according to a predefined attribute mapping, said attribute data for use by said data encoder, and provide said formatted attribute data to said data encoder, said data encoder operable to encode said formatted attribute data, said pixel encoder operable to read said pixel stream out of said frame memory and encode said pixel stream, said channel encoder operable to encode said encoded pixel stream only on a first channel, and said encoded and formatted attribute data only on a second channel, and to combine said first and second channels so that there is a defined relationship between video pixels in an image and attribute data for said image.

2. The video receiver of claim 1 wherein said channel encoder is operable to synchronously combine said first and second channels.

3. The video receiver of claim 2, further comprising a video processor, said video processor comprising a channel decoder operable to receive said first and second channels, and to extract and decode said encoded pixel stream provided on said first channel and said encoded and formatted associated attribute data provided on said second channel.

4. The video receiver of claim 3, wherein said video processor comprises at least one of a video scaler, a color space converter and a deinterlacer.

5. The video receiver of claim 4, wherein said channel decoder is operable to communicate with said at least one of said video scaler, said color space converter and said deinterlacer to provide said decoded attribute data.

6. The video receiver of claim 4, wherein said channel encoder and said video processor are interconnected by a serial link operable to carry said first and second channels.

7. The video receiver of claim 4, wherein said channel encoder and said video processor are interconnected by a parallel link operable to carry said first and second channels.

8. The video receiver of claim 2, wherein said video decoder comprises a run length decoder.

9. The video receiver of claim 2, wherein said video decoder comprise an inverse discrete cosine transform block.

10. The video receiver of claim 2, wherein said video decoder comprises a variable length decoder.

11. The video receiver of claim 2, wherein said data encoder is operable to encode said formatted attribute data into a defined format.

12. The video receiver of claim 11, wherein said channel encoder comprises a multiplexer operable to time-division multiplex said first channel and said second channel.

13. The video receiver of claim 12, wherein said channel encoder comprises an ITU-R BT.656-4 compliant encoder.

14. The video receiver of claim 2, wherein said encoded and formatted attribute data provided on said first channel for said image is transmitted concurrently with said encoded pixel stream provided on said second channel for said image.

15. The video receiver of claim 1, wherein said predefined attribute mapping comprises a chroma format, a resolution, a picture structure type, or any combination thereof.

16. A method for displaying video from a compressed video bit stream, said method comprising:
   decoding said compressed video bit stream to form a decompressed pixel stream and associated video attribute data,
   storing said associated video attribute data in registers and said decompressed pixel stream in a frame memory;
   reading out by a pixel encoder said decompressed pixel stream from said frame memory;
   reading out by an attribute formatter said video attribute data from said registers;
   formatting said video attribute data by said attribute formatter according to a predefined attribute mapping, said video attribute data for use by a data encoder;
   encoding by said data encoder said formatted video attribute data;
   encoding by said pixel encoder said decompressed pixel stream;
   encoding by a channel encoder said encoded pixel stream and said encoded formatted video attribute data to provide a first encoded pixel stream and a first encoded video attribute data, respectively;

transferring said first encoded pixel stream to a video processor only through a first channel, for processing said first encoded pixel stream for presentation on a display; and transferring said first encoded video attribute data to said video processor only through a second channel so as to maintain a defined relationship between said first encoded pixel stream and said first encoded video attribute data.

17. The method of claim 16, further comprising processing in said video processor, video images using said associated video attribute data corresponding to said first encoded video attribute data, each processed video frame to be provided for presentation on said display, wherein said first encoded video attribute data is transferred synchronously with said first encoded pixel stream to said video processor.

18. The method of claim 17, wherein said processing comprises scaling said video images.

19. The method of claim 17, wherein said processing comprises color converting a decoded version of said first encoded pixel stream for presentation on said display.

20. The method of claim 17, wherein said processing comprises selectively de-interlacing a decoded version of said first encoded pixel stream for presentation on said display, in dependence on a decoded version of said first encoded video attribute data.

21. The method of claim 17, wherein said compressed video bit stream comprises an MPEG-2 encoded bit stream.

22. The method of claim 17, wherein said compressed video bit stream comprises an MPEG-1 encoded bit stream.

23. A non-transitory computer readable medium storing processor executable instructions, that when loaded in memory in communication with said processor, adapt said processor to cause:

decoding of a compressed video bit stream to form a decompressed pixel stream and associated video attribute data, storing of said associated video attribute data in registers and said decompressed pixel stream in a frame memory;

reading out by a pixel encoder said decompressed pixel stream from said frame memory;

reading out by an attribute formatter said video attribute data from said registers;

formatting of said video attribute data by said attribute formatter according to a predefined attribute mapping, said video attribute data for use by a data encoder;

encoding by said data encoder said formatted video attribute data;

encoding by said pixel encoder said decompressed pixel stream;

encoding by a channel encoder said encoded pixel stream and said encoded formatted video attribute data to provide a first encoded pixel stream and a first encoded video attribute data, respectively;

transferring of said first encoded pixel stream to a video processor only through a first channel, for processing said first encoded pixel stream for presentation on a display; and transferring of said first encoded video attribute data to said video processor only through a second channel so as to maintain a defined relationship between said first encoded pixel stream and said first encoded video attribute data.

\* \* \* \* \*